United States Patent
Chen et al.

(10) Patent No.: US 8,824,387 B2
(45) Date of Patent: Sep. 2, 2014

(54) RESOURCE MAPPING FOR MULTICARRIER OPERATION

(75) Inventors: Wanshi Chen, San Diego, CA (US); Juan Montojo, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 13/051,273

(22) Filed: Mar. 18, 2011

(65) Prior Publication Data

US 2012/0069802 A1 Mar. 22, 2012

Related U.S. Application Data

(60) Provisional application No. 61/315,825, filed on Mar. 19, 2010.

(51) Int. Cl.
*H04W 4/00* (2009.01)
(52) U.S. Cl.
USPC .......................................... 370/329; 455/450
(58) Field of Classification Search
None
See application file for complete search history.

(56) References Cited

U.S. PATENT DOCUMENTS

| | | | | |
|---|---|---|---|---|
| 2011/0103327 | A1* | 5/2011 | Lee et al. | 370/329 |
| 2011/0170499 | A1* | 7/2011 | Nayeb Nazar et al. | 370/329 |
| 2011/0268032 | A1* | 11/2011 | Kim et al. | 370/328 |
| 2011/0305134 | A1* | 12/2011 | Chung et al. | 370/216 |
| 2012/0250663 | A1* | 10/2012 | Han et al. | 370/336 |
| 2012/0275409 | A1* | 11/2012 | Han et al. | 370/329 |
| 2012/0307758 | A1* | 12/2012 | Moon et al. | 370/329 |

FOREIGN PATENT DOCUMENTS

| | | |
|---|---|---|
| JP | 2011508502 A | 3/2011 |
| JP | 2011514732 A | 5/2011 |
| WO | 2009087597 A1 | 7/2009 |
| WO | 2009099306 A1 | 8/2009 |

OTHER PUBLICATIONS

Alcatel-Lucent et al: "Way Forward on PHICH design", 3GPP Draft; R1-100915, 3rd Generation Partnership Project (3GPP), Mobile Competence Centre ; 650, Route Deslucioles ; F-06921 Sophia-Antipolis Cedex; France, vol. RAN WG1, No. San Francisco, USA; 20100222, Feb. 16, 2010, XP050418515, [retrieved on Feb. 16, 2010].
International Search Report and Written Opinion—PCT/US2011/029137—ISA/EPO—Oct. 5, 2011.

(Continued)

*Primary Examiner* — Brian Roberts
(74) *Attorney, Agent, or Firm* — Paul Kuo

(57) ABSTRACT

An apparatus for wireless communication may allocate resources for multicarrier wireless communication. The apparatus may be enabled for cross-carrier signaling and semi-persistent scheduling on at least one carrier. Semi-persistent scheduling may be enabled by deriving a resource, such as a PHICH resource, for uplink HARQ operation using at least part of a demodulation reference signal field. The resource may be chose to reduce PHICH collision and may be based on a starting physical block of uplink data transmission. Cross-carrier signaling may be enabled by an information field, such as a carrier indicator field in the PDCCH, not enabled when cross-carrier signaling is not enabled.

28 Claims, 13 Drawing Sheets

(56) References Cited

OTHER PUBLICATIONS

LG Electronics Inc: "PHICH Design in Carrier Aggregation Scenarios", 3GPP Draft; R1-101228_PHICH_CA_LGE, 3rd Generation Partnership Project (3GPP), Mobile Competence Centre ; 650, Route Deslucioles ; F-06921 Sophia-Antipolis Cedex; France, vol. RAN WG1, No. San Francisco, USA; Feb. 22, 2010, Feb. 16, 2010, XP050418742, [retrieved on Feb. 16, 2010].

Motorola: "PHICH for Carrier Aggregation", 3GPP Draft; R1-093985, 3rd Generation Partnership Project (3GPP), Mobile Competence Centre; 650, Route Deslucioles; F-06921 Sophia-Ntipolis Cedex; France, No. Miyazaki; Oct. 12, 2009, XP050388475, [retrieved on Oct. 6, 2009].

NEC Group: "PHICH carrier linkage for carrier aggregation", 3GPP Draft; R1-093861-PHICH, 3rd Generation Partnership Project (3GPP), Mobile Competence Centre ; 650, Route Deslucioles ; F-06921 Sophia-Antipolis Cedex; France, No. Miyazaki; Oct. 12, 2009, XP050388366, [retrieved on Oct. 5, 2009].

QUALCOMM Europe: "PHICH for Multicarrier Operation", 3GPP Draft; R1-094205 PHICH for MC, 3rd Generation Partnership Project (3GPP), Mobile Competence Centre ; 650, Route Deslucioles ; F-06921 Sophia-Antipolis Cedex; France, No. Miyazaki; Oct. 12, 2009, XP050388675, [retrieved on Oct. 6, 2009].

Samsung: "PHICH Mapping in Asymmetric Carrier Aggregation", 3GPP Draft; R1-093396 PHICH Asymmetric CA, 3rd Generation Partnership Project (3GPP), Mobile Competence Centre ; 650, Route Deslucioles ; F-06921 Sophia-Antipolis Cedex; France, No. Shenzhen, China; Aug. 19, 2009, XP050351692, [retrieved on Aug. 19, 2009].

\* cited by examiner

RESOURCE MAPPING FOR MULTICARRIER OPERATION

CROSS REFERENCE TO RELATED APPLICATIONS

This application claims the benefit of U.S. provisional patent application No. 61/315,825 filed Mar. 19, 2010, in the names of CHEN et al., the disclosure of which is expressly incorporated herein by reference in its entirety.

BACKGROUND

1. Field

Aspects of the present disclosure relate generally to wireless communication systems, and more particularly to facilitating resource mapping for multicarrier operation.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method of wireless communication executed by a user equipment configured for multicarrier operation is offered. The method includes enabling cross-carrier signaling. The method also includes enabling semi-persistent scheduling on at least one carrier. The method further includes activating semi-persistent scheduling on the at least one carrier. The activating includes deriving a resource for uplink hybrid automatic repeat request (HARQ) operation using at least part of a demodulation reference signal field.

An apparatus for wireless communication configured for multicarrier operation is offered. The apparatus includes means for enabling cross-carrier signaling. The apparatus also includes means for enabling semi-persistent scheduling on at least one carrier. The apparatus further includes means for activating semi-persistent scheduling on the at least one carrier. The means for activating includes deriving a resource for uplink hybrid automatic repeat request (HARQ) operation using at least part of a demodulation reference signal field.

A computer program product configured for multicarrier operation for wireless communications in a wireless network is offered. The computer program product includes a computer-readable medium having program code recorded thereon. The program code includes program code to enable cross-carrier signaling. The program code also includes program code to enable semi-persistent scheduling on at least one carrier. The program code further includes program code to activate semi-persistent scheduling on the at least one carrier. The program code to activate includes program code to derive a resource for uplink hybrid automatic repeat request (HARQ) operation using at least part of a demodulation reference signal field.

An apparatus configured for multicarrier operation for wireless communication is offered. The apparatus includes a memory and a processor(s) coupled to the memory and configured to enable cross-carrier signaling. The processor(s) is also configured to enable semi-persistent scheduling on at least one carrier. The processor(s) is further configured to activate semi-persistent scheduling on the at least one carrier by deriving a resource for uplink hybrid automatic repeat request (HARQ) operation using at least part of a demodulation reference signal field.

A method of determining physical hybrid automatic repeat request (HARQ) indicator channel (PHICH) resources is offered. The method includes indexing uplink resources starting with an uplink carrier paired with a corresponding downlink carrier.

In another aspect, an apparatus for determining physical hybrid automatic repeat request (HARQ) indicator channel (PHICH) resources is offered. The apparatus includes means for indexing uplink resources starting with an uplink carrier paired with a corresponding downlink carrier; and means for communicating on at least one of said uplink resources.

In yet another aspect, an apparatus is configured to determine physical hybrid automatic repeat request (HARQ) indicator channel (PHICH) resources. The apparatus includes a memory; and at least one processor coupled to the memory and configured to index uplink resources starting with an uplink carrier paired with a corresponding downlink carrier.

In still another aspect, a computer program product is configured to determine physical hybrid automatic repeat request (HARQ) indicator channel (PHICH) resources. The computer program product includes a non-transitory computer-readable medium having program code recorded thereon. The program code indexes uplink resources starting with an uplink carrier paired with a corresponding downlink carrier.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
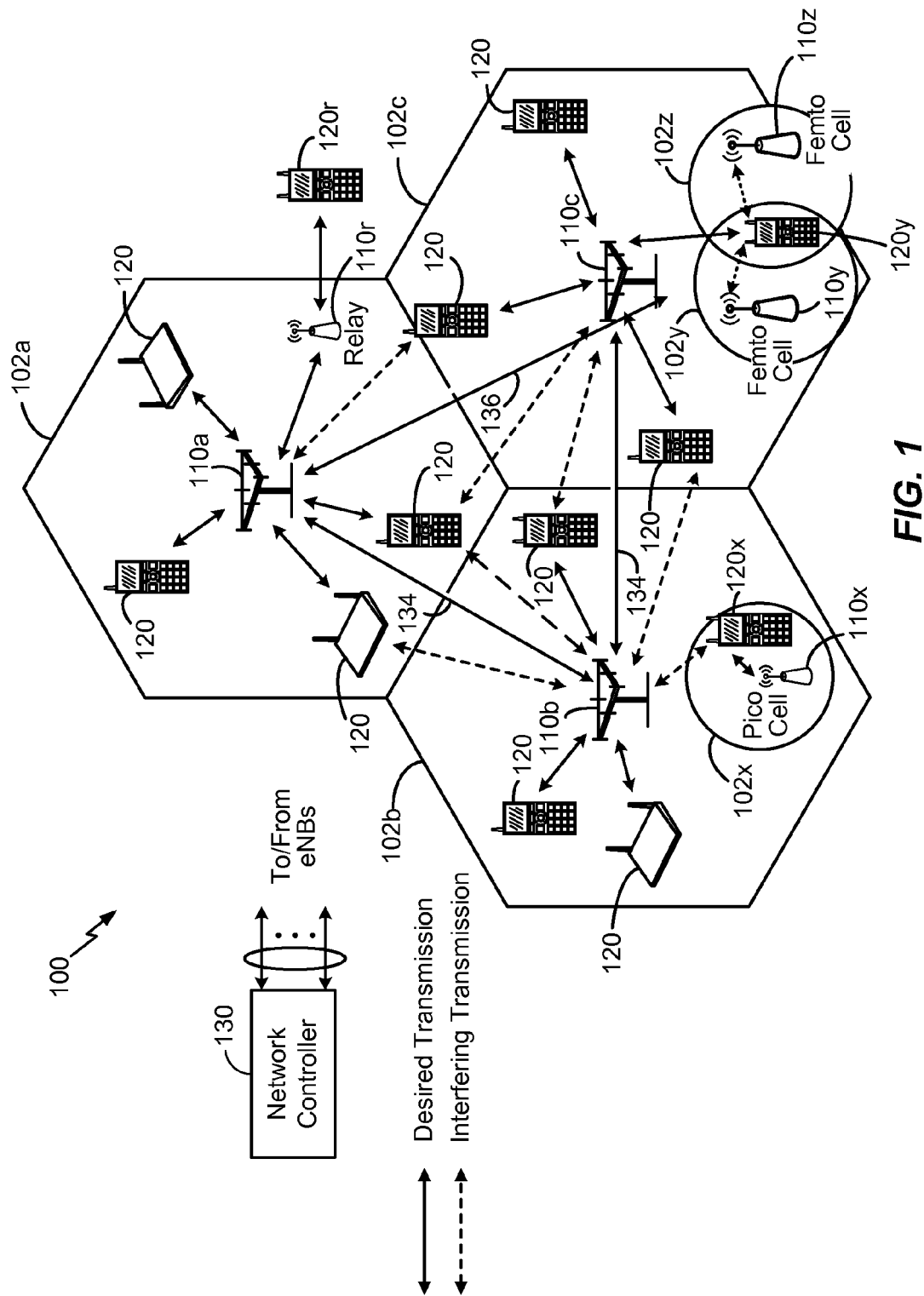
FIG. 1 is a block diagram conceptually illustrating an example of a mobile communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 also includes relay stations. A relay station is a station that receives a transmission of data and/or other information from an upstream station (e.g., an eNodeB, a UE, or the like) and sends a transmission of the data and/or other information to a downstream station (e.g., another UE, another eNodeB, or the like). A relay station may also be a UE that relays transmissions for other UEs. In the example shown in FIG. 1, a relay station 110r may communicate with the eNodeB 110a and a UE 120r, in which the relay station 110r acts as a relay between the two network elements (the eNodeB 110a and the UE 120r) in order to facilitate communication between them. A relay station may also be referred to as a relay eNodeB, a relay, and the like.

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB. According to an aspect of the present disclosure, a UE 120 communicating with a base station 110a hands over to a base station 110b without the base station 110a first preparing the base station 110b for the handover. Such a handover will be referred to as a "forward handover."

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
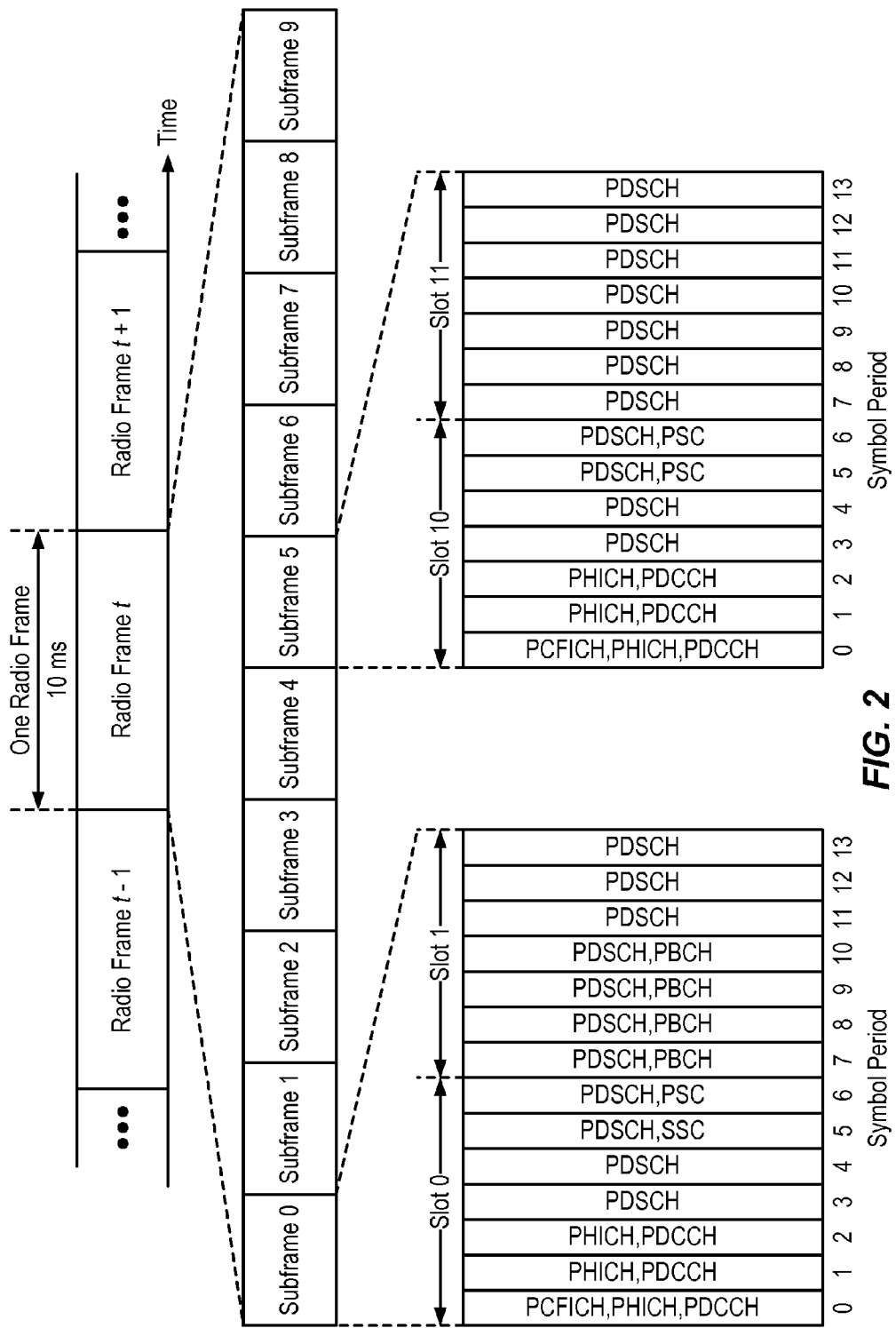
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
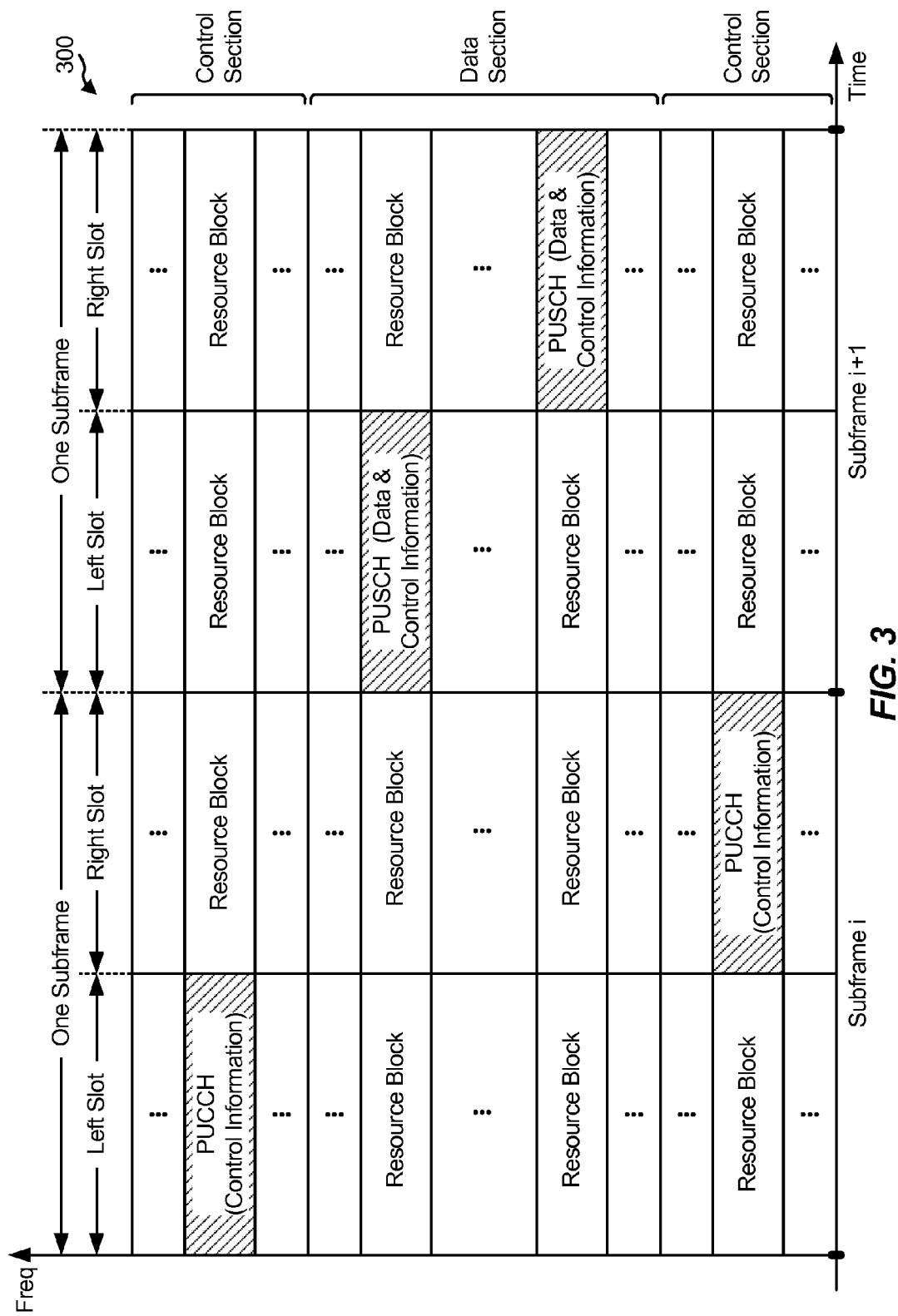
FIG. 3 is a block diagram conceptually illustrating an exemplary frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
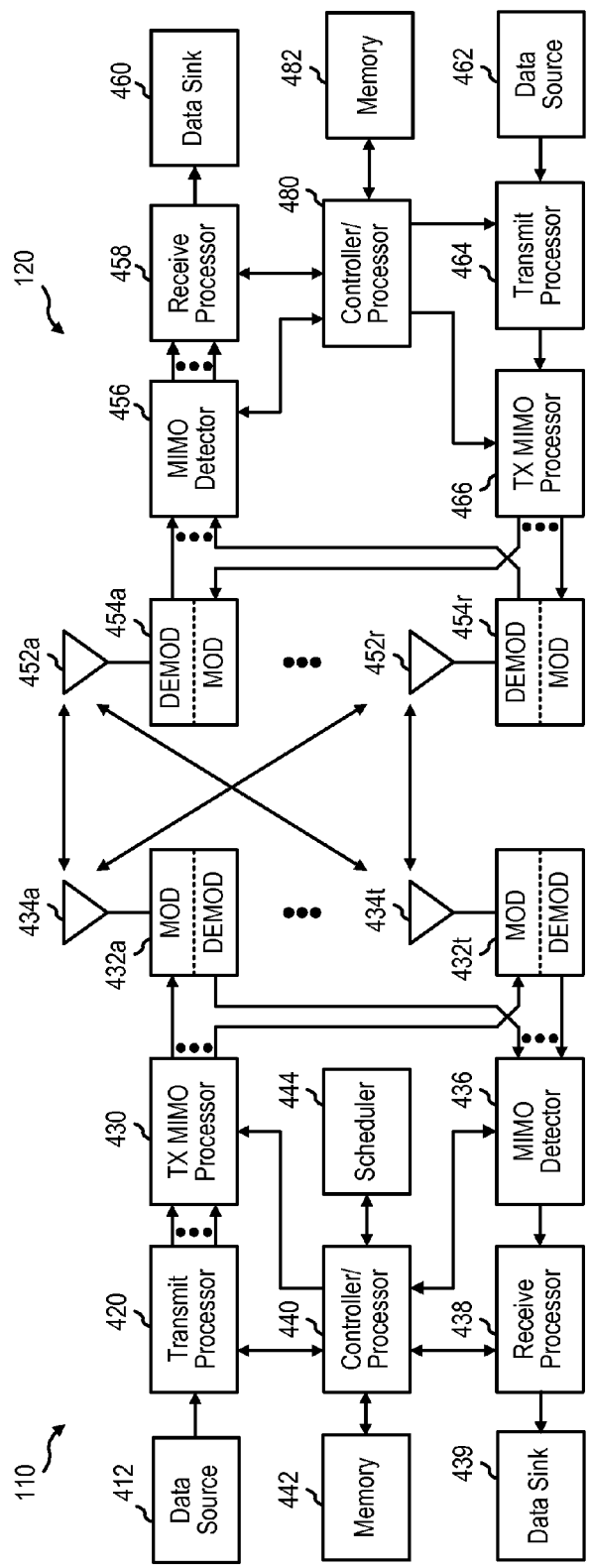
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of processes for the techniques described herein. The memories 442 and 482 may store data and program codes for the base station 110 and the UE 120, respectively. A scheduler 444 may schedule UEs for data transmission on the downlink and/or uplink.

Carrier Aggregation

LTE-Advanced UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 5A:
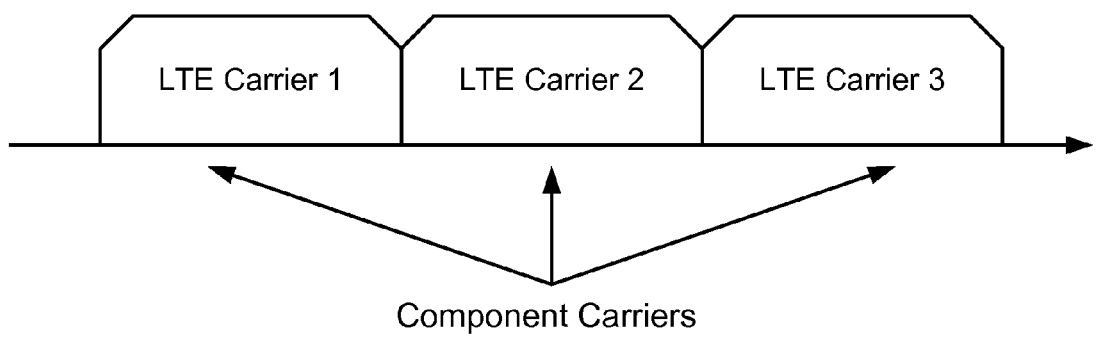
FIG. 5A discloses a continuous carrier aggregation type.
Figure 5B:
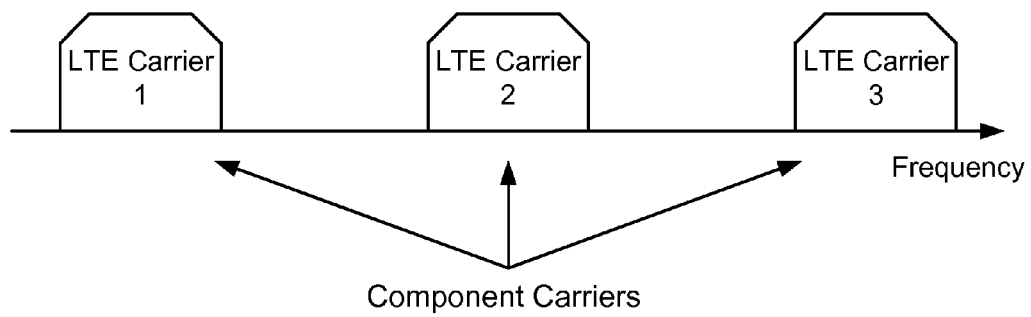
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 6:
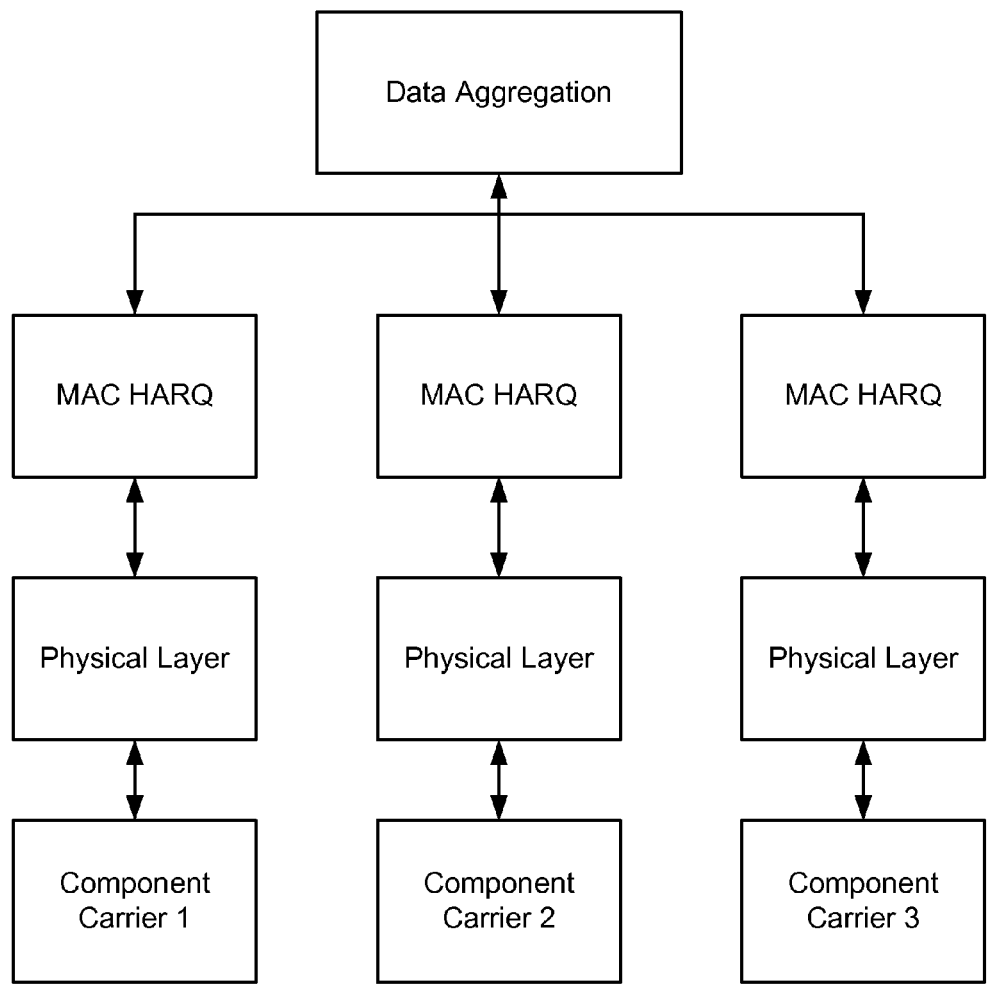
FIG. 6 discloses MAC layer data aggregation.

FIG. 6 illustrates aggregating transmission blocks (TBs) from different component carriers at the medium access control (MAC) layer (FIG. 6) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 7:
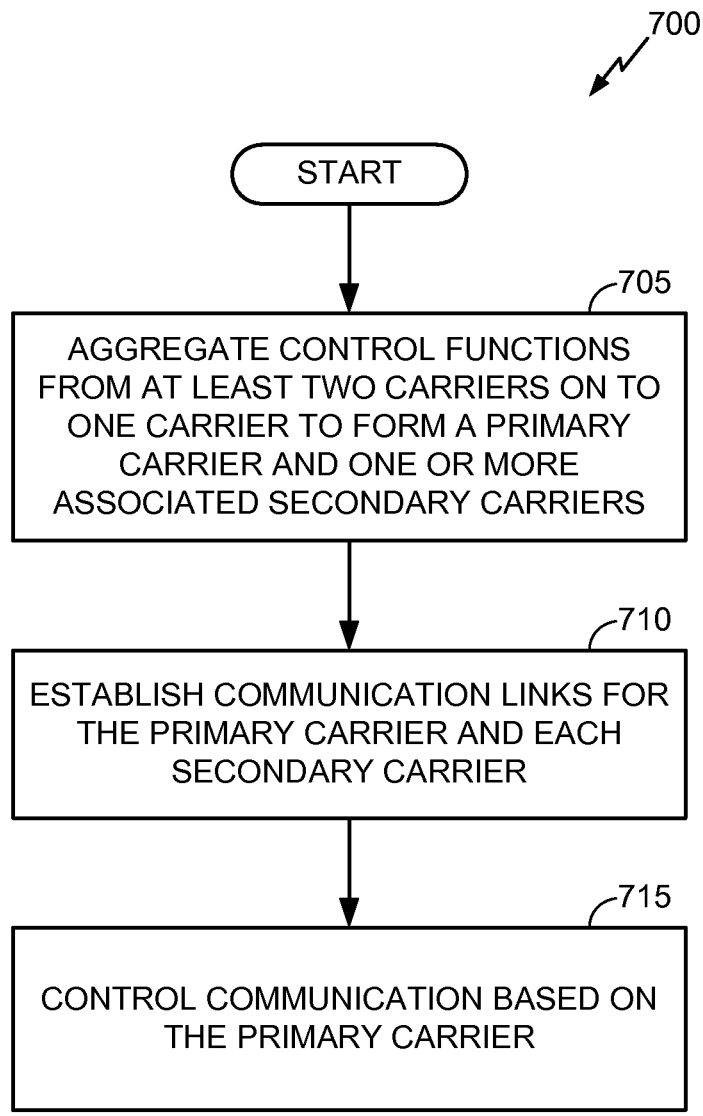
FIG. 7 is a block diagram illustrating a method for controlling radio links in multiple carrier configurations.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

Multicarrier Resource Mapping

Figure 8:
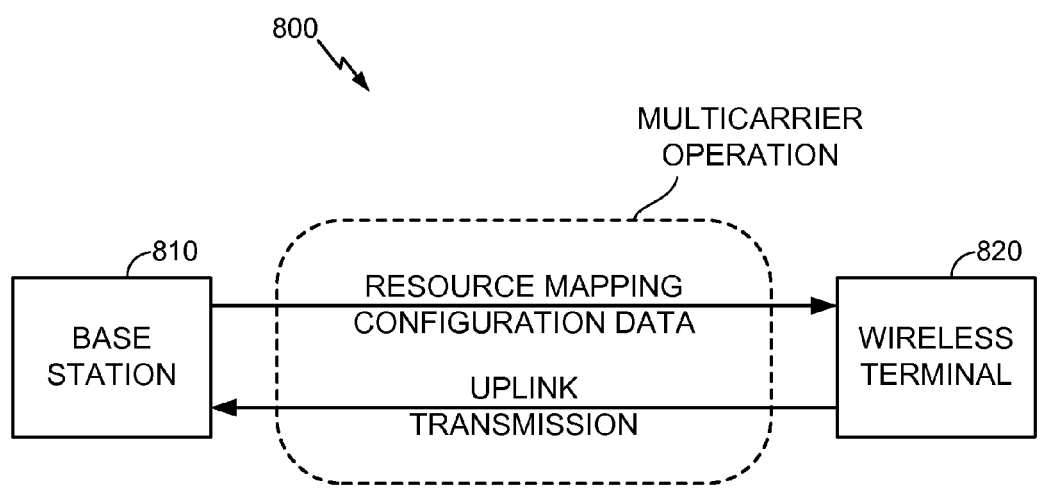
FIG. 8 is an illustration of an exemplary environment that facilitates resource mapping according to one aspect of the present disclosure.

The aspects disclosed herein are generally directed towards design considerations for resource mapping, particularly in LTE systems. In one aspect, the subject specification discloses design considerations directed towards PHICH (Physical Hybrid ARQ Indicator Channel) resource mapping for uplink semi-persistent scheduling (UL SPS) in LTE-advanced (LTE-A) multicarrier operation. In FIG. 8, an exemplary LTE environment that facilitates resource mapping according to one aspect is provided. As shown, the environment 800 includes a base station 810, which is communicatively coupled to a wireless terminal 820. In an aspect, the base station 810 provides configuration data to the wireless terminal 820. The configuration data includes instructions for avoiding PHICH resource mapping collisions. In a particular aspect, the configuration data instructs the wireless terminal 820 to perform resource index cycling and/or a bit-field allocation, as discussed in more detail below.

Here, with respect to LTE systems, it should be noted that the hybrid automatic repeat request (HARQ) feedback reflecting the correctly or incorrectly decoded Physical Uplink Shared Channel (PUSCH) packet is transmitted on the downlink (DL) carrier paired with the uplink (UL) carrier where the PUSCH was transmitted. In a multicarrier LTE-advanced (LTE-A) system, in addition to the symmetric uplink/downlink configuration, it may be desirable for the HARQ feedback design to accommodate possible asymmetric uplink/downlink carrier configurations and operation with cross-carrier control.

In some aspects, PHICH physical transmission concepts from Rel-8 may be used (orthogonal code design, modulation, scrambling sequence, mapping to resource elements) so that PHICH is transmitted only on the downlink carrier that transmitted the downlink grant. PHICH resource Rel-8 mapping rules for 1:1 or many:1 downlink/uplink configurations without cross-carrier control may also be used. Presented here, in one aspect, is an approach based on the Rel-8 HARQ feedback. The HARQ feedback may be sent on PHICH for the case of asymmetric 1:many downlink/uplink carrier configuration or cross-carrier control operation.

With respect to uplink semi-persistent scheduling (SPS) further aspects are contemplated. In SPS, a set of resources and transport formats are pre-allocated and are persistently maintained during a specific time interval. As a result, some SPS parameters (e.g., periodicity) are configured semi-statically through RRC signaling (i.e., the RRC layer in Layer 3). For example, when a predetermined amount of data is transmitted during a specific time interval in the same way, control information need not be transmitted each data transmission interval for resource allocation. Thus, the amount of control information that is transmitted may be reduced when using SPS. Voice over Internet Protocol (VoIP) is an example where a predetermined amount of data is transmitted during a specific time interval in the same way. Thus, use of SPS with VoIP reduces the amount of control information consumed.

Here, it should be noted that uplink SPS may be activated/re-configured via downlink control information (DCI) format 0 or any other DCI format for uplink grants. The DCI is a message carried by a PDCCH. The message includes control information such as resource assignments for a UE or a group of UEs. The control information sent on each PDCCH may convey one or more downlink grants, one or more uplink grants, power control information, and/or other information. A downlink grant may carry control information for data transmission on the downlink. An uplink grant may carry control information for data transmission on the uplink. A grant may be sent to a specific UE or a group of UEs. A grant may also be referred to as an assignment. A UE may be configured to listen to one or more instances of the PDCCH.

In an aspect, to reduce the probability of false detection of uplink SPS activation/reconfiguration, six bits in DCI format 0 are set to zeros to virtually increase the cyclic redundancy check (CRC) length from the nominal 16 bits to 22 bits, as shown in the table T-1 below. In particular, table T-1 shows special fields for uplink SPS activation PDCCH (Physical Downlink Control Channel) validation, wherein the cyclic shift demodulation resource signal (DM-RS) field is set to 000.

TABLE T-1

|  | DCI format 0 |
| --- | --- |
| TPC (Transmit Power Control) command for scheduled PUSCH | set to '00' |
| Cyclic shift DM RS | set to '000' |
| Modulation and coding scheme and redundancy version | Most significant bit is set to '0' |

For an uplink PUSCH transmission, PHICH may be used for the acknowledgment, either positively or negatively. For such an aspect, the UE may determine the PHICH resource for the corresponding PUSCH transmission. In an aspect, the PHICH resource is identified by the index pair $(n_{PHICH}^{group}, n_{PHICH}^{seq})$ PHICH where $n_{PHICH}^{group}$ is the PHICH group number and $n_{PHICH}^{seq}$ is the orthogonal sequence index within the group as defined by Equation (1):

$$n_{PHICH}^{group} = (I_{PRB\_RA}^{lowest\_index} + n_{DMRS}) \bmod N_{PHICH}^{group} + I_{PHICH} N_{PHICH}^{group}$$
$$n_{PHICH}^{seq} = (\lfloor I_{PRB\_RA}^{lowest\_index} / N_{PHICH}^{group} \rfloor + n_{DMRS}) \bmod 2 N_{SF}^{PHICH}$$

Equation (1)

where
- $n_{DMRS}$ is mapped from the cyclic shift for the DM-RS field in the most recent DCI format 0 for the transport block associated with the corresponding PUSCH transmission. $n_{DMRS}$ is set to zero, if there is no PDCCH with DCI format 0 for the same transport block, and
  - if the initial PUSCH for the same transport block is semi-persistently scheduled, or
  - if the initial PUSCH for the same transport block is scheduled by the random access response grant.
- $N_{SF}^{PHICH}$ is the spreading factor size used for PHICH modulation.
- $I_{PRB\_RA}^{lowest\_index}$ is the lowest Physical Resource Block (PRB) index in the first slot of the corresponding PUSCH transmission
- $N_{PHICH}^{group}$ is the number of PHICH groups configured by higher layers, $$I_{PHICH} = \begin{cases} 1 & \text{for } TDD UL/DL \text{ configuration 0 with} \\ & PUSCH \text{ transmission in subframe } n = 4 \text{ or } 9 \\ 0 & \text{otherwise} \end{cases}$$

The number of PHICH groups $N_{PHICH}^{group}$ is derived based on downlink system bandwidth and the PHICH resource indicator $N_g$ broadcast in the master information block, where $N_g$ may take a value from $\{1/6, 1/2, 1, 2\}$. In particular, for FDD:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

For instance, if the downlink system bandwidth is 100 resource blocks (RBs), for the normal cyclic prefix (CP) case, the total number of PHICH resources is equal to 8*ceiling $(N_g*100/8)$, which is 104 for $N_g=1$. When the uplink system bandwidth is the same as downlink bandwidth, and if uplink spatial division multiplexing access (SDMA)—up to 8-way SDMA—is supported, the total number of possible unique PUSCH transmissions may be up to:

100(RBs)*8(SDMA)=800

Without the involvement of $n_{DMRS}$, two or more PUSCH transmissions may map to the same PHICH resource resulting in PHICH collision. Generally, the collision probability may depend on the configuration of $N_g$, uplink SDMA support, the difference between downlink and system bandwidths, etc.

In order to avoid PHICH collision, $n_{DMRS}$ may be used, which is part of the information fields in DCI format 0 for dynamically scheduled PUSCH transmissions. That is, the eNB scheduler may, when desired, pick different values of $n_{DMRS}$ for different PUSCH transmissions to avoid PHICH collision.

However, for uplink semi-persistent scheduling, as indicated earlier, if there is no PDCCH with DCI format 0 for the same transport block, and if the initial PUSCH for the same transport block is semi-persistently scheduled, $n_{DMRS}$ is set to zero,.

In LTE-A, a UE may be configured with multiple carriers (sometimes referred to as "component carriers" or "CCs"). For instance, the transmission of Physical Downlink Shared Channel (PDSCH) on one carrier may be signaled by PDCCH on a different carrier (which is also known as "cross-carrier signaling"). In an aspect, cross-carrier signaling is realized via an explicit cross-carrier indicator field (CIF) in the PDCCH. Use of the CIF may exist in various implementations. For example: the presence of the carrier-indicator field may be semi-statically enabled; configuration for the presence of CIF may be UE-specific (i.e. not system-specific or cell-specific); CIF (if configured) may be a fixed 3-bit field; CIF (if configured) location may be fixed irrespective of DCI format size; cross-carrier assignments may be configured both when the DCI formats have the same or different sizes; cross carrier scheduling for DCI formats 0, 1, 1A, 1B, 1D, 2, 2A, and 2B, etc., in the UE-specific search space may be supported by an explicit CIF; CIF may not be included in DCI format when the cyclic redundancy code (CRC) is scrambled by a system information (SI) radio network temporary identifier (RNTI); and/or CIF may not be included in DCI formats 0 or 1A in the common search space when CRC is scrambled by a Cell-RNTI/semi-persistent scheduling (SMS) RNTI. Here, it should thus be noted that the introduction of CIF in a PDCCH changes the DCI format size and results in a new DCI format. Namely, the DCI format size is increased by three or more bits relative to the original.

Figure 9:
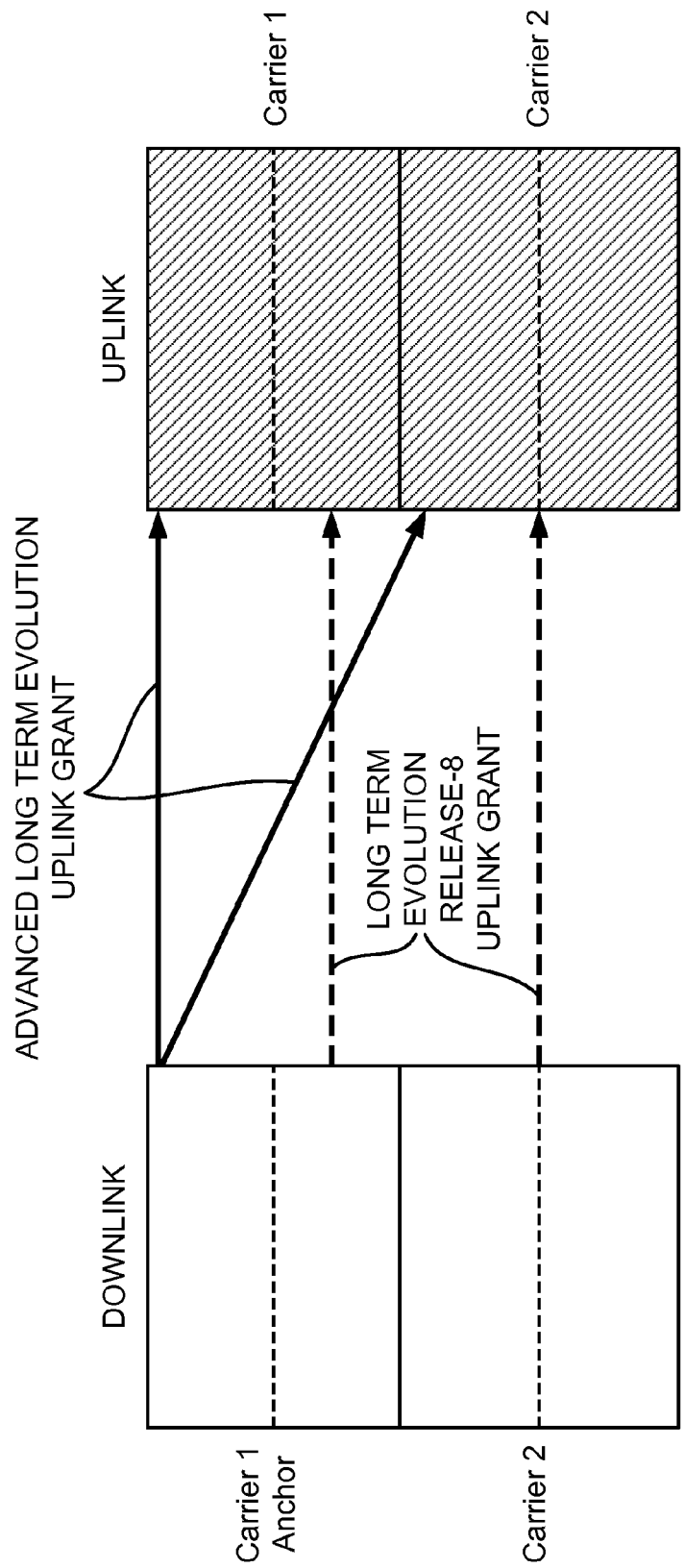
FIG. 9 is a first exemplary illustration of a one-to-many downlink to uplink resource mapping.

PHICH mapping based on an uplink grant transmission may result in multiple uplink carriers being mapped to one downlink carrier (1:many DL/UL mapping). This may occur either when the cross-carrier operation is enabled (resources for multiple uplink carriers assigned through multiple single carrier grants sent on one downlink carrier) or in the asymmetric UL/DL carrier configuration when the number of uplink carriers is larger than the number of downlink carriers. An illustration of the former is provided in FIG. 9., One downlink carrier (i.e., Carrier 1 in FIG. 9) carries PHICH resources for multiple uplink carriers. For this particular example, it is assumed that both uplink carriers have the same system bandwidth. Namely, $N_{RB}^{UL}$, the set of PRB indices used for PHICH resource mapping as shown in Equation (1) above is given by:

$\{1, \ldots, N_{RB}^{UL}\}$ for carrier 1, and $\{1, \ldots, N_{RB}^{UL}\}$ for carrier 2

That is, both uplink carriers have the same set of PRB indices for PHICH resource mapping on the same downlink carrier. Since $n_{DMRS}$ is set to zero for uplink SPS, even when $N_g=2$ (PHICH resource roughly doubles that of uplink bandwidth), PHICH collision still happens as the uplink SPS support on both carriers use the same set of starting PRBs. Such restriction is undesirable.

Figure 10:
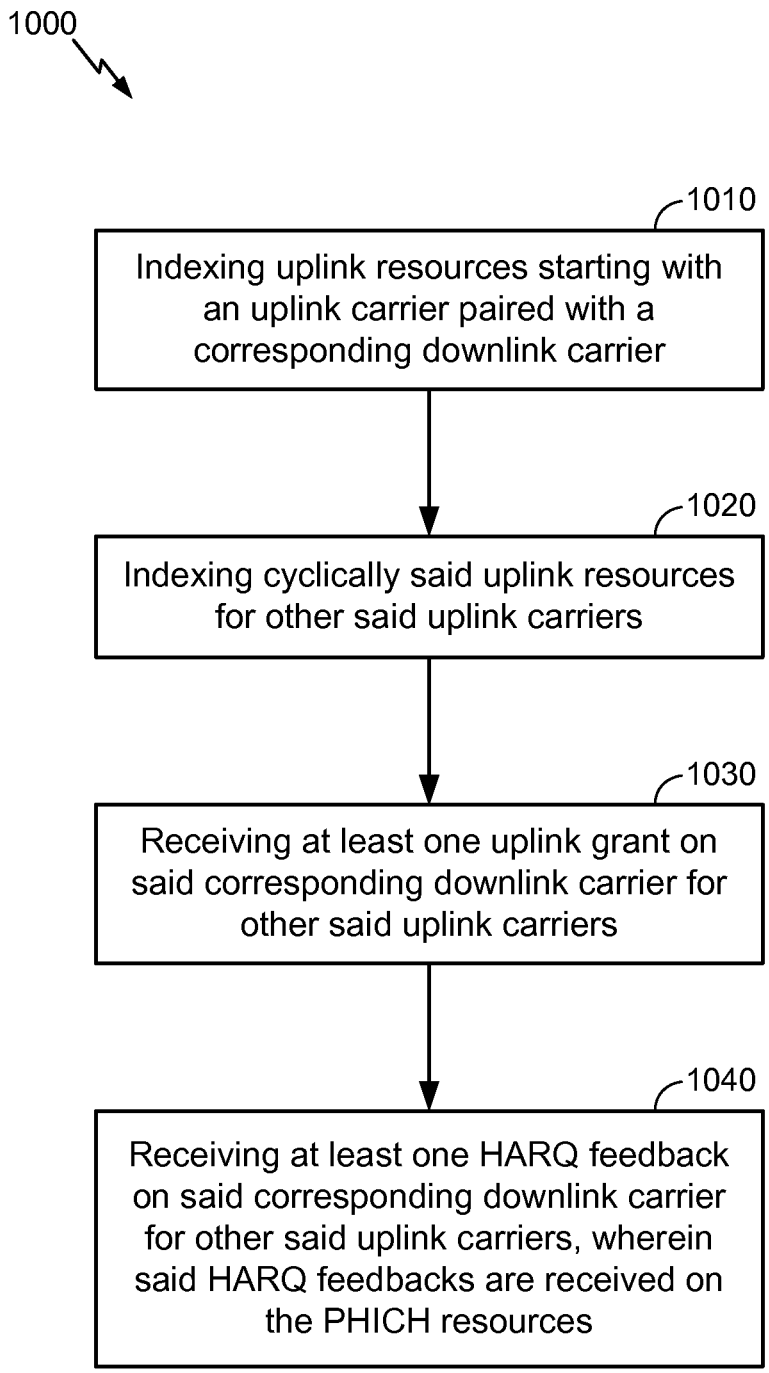
FIG. 10 is an illustration of resource mapping according to one aspect of the present disclosure.

FIG. 10 is a flowchart 1000 disclosing the steps executed when using resource index cycling to avoid PHICH resource mapping collisions. One possible solution is to start the uplink resource indexing for the purpose of PHICH resource determination from the uplink carrier paired with the corresponding downlink carrier 1010 as defined in Rel-8 system information. In doing so, backward compatibility for Rel-8 UEs is preserved. For this aspect, the indexing then continues cyclically for other carriers applicable to the LTE-A UEs 1020. The indexing occurs system-wide, taking into account all uplink carriers that could be assigned by the grant coming from that downlink carrier. In an aspect, the indexing is not based on a UE specific configuration, i.e., LTE-A UE could be configured for only a subset of carriers, but counts uplink resource blocks based on the system configuration. For instance, LTE-A UEs could use the subset of the PHICH resources corresponding to their assigned uplink carriers.

Figure 11:
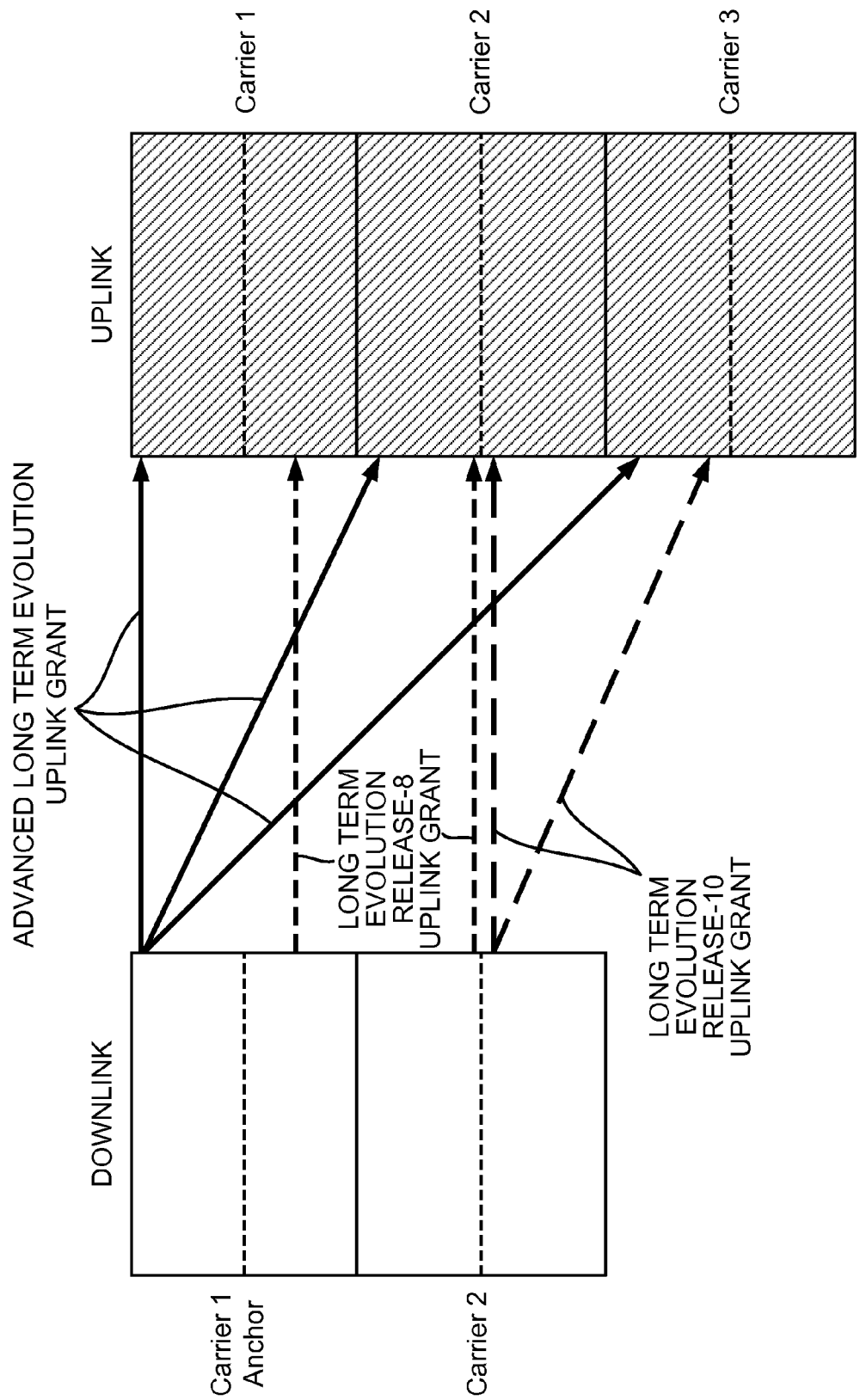
FIG. 11 is a second exemplary illustration of a one-to-many downlink to uplink resource mapping.

In FIG. 11, another exemplary PHICH mapping is provided. For this particular example, Rel-8 uplink grant and PHICH arrive on the carrier based on pairing—Rel-8 UEs on carriers 1 and 2 apply Rel-8 mapping rules for PHICH sent on downlink carrier 1 and 2, respectively. LTE-A UEs receive the uplink grants for uplink carriers 1, 2 and 3 on the downlink anchor carrier 1 1030, and therefore the HARQ feedbacks are transmitted on the appropriate PHICH resources on the same downlink anchor carrier 1040 (shown in the flowchart 1000 of FIG. 10). Namely, the mapping illustrated in FIG. 11 can be summarized as:

PHICH CC1: 1 to $N_{RB1}+N_{RB2}+N_{RB3}$
  (UL CC1 (LTE and LTE-A UEs): 1 to $N_{RB1}$;
  UL CC2 (LTE-A UEs): $1+N_{RB1}$ to $N_{RB1}+N_{RB2}$
  UL CC3 (LTE-A UEs): $1+N_{RB1}+N_{RB2}$ to $N_{RB1}+N_{RB2}+N_{RB3}$)
PHICH CC2: 1 to $N_{RB2}$
  (UL CC2 (LTE only UEs): 1 to $N_{RB2}$)

The solution illustrated in FIG. 11 thus provides a PHICH design for LTE-A multicarrier operation that is transparent to the UL/DL carrier asymmetry and based on Rel-8 mapping. Namely, if PHICH is transmitted on the carrier where the uplink grant was transmitted, a PHICH design is contemplated in which Rel-8 mapping rules are implemented with uplink resource indexing applied across applicable uplink carriers. For this aspect, the uplink resource indexing for the purpose of PHICH resource determination on a downlink carrier starts from the uplink carrier paired with that downlink carrier as defined in Rel-8 system information. Within such an aspect, backward compatibility for Rel-8 UEs is preserved, by having the uplink resource indexing, for purposes of PHICH resource determination on a downlink carrier, continue cyclically for other uplink carriers for which the uplink grant may be transmitted on that downlink carrier. For some aspects, this may be applicable only to LTE-A UEs.

Other solutions, however, are also possible. For instance, an issue in PHICH collision for uplink semi persistent scheduling (SPS) is the unavailability of the 3-bit DM-RS field as it is set to 000 for the purpose of virtual CRC increase for reduced false alarm probability. That is, the 3 bits of the DM-RS may be used to reduce the probability of false positive CRC tests by serving as virtual CRC bits for SPS grants. In order to address the PHICH collision issue for uplink SPS in LTE-A multicarrier, the following may thus be considered: 1) for uplink SPS, activation/reconfiguration may still be set to non-zero values as in the dynamic scheduling case, such that the DM-RS field may be used for uplink SPS to reduce PHICH collision; and 2) the false alarm probability for uplink SPS activation/re-configuration may be at least the same as in Rel-8.

At least for cross-carrier signaling, however, CIF is included, which is a 3-bit field as well. For a given UE, the CIF value for a particular uplink carrier may be fixed, and thus may be used for the purpose of virtual CRC. For the case of asymmetric downlink and uplink configuration when there is a 1:many downlink to uplink configuration (which is not supported in Rel-10), one may also correspondingly introduce a 3-bit CIF-like field.

Accordingly, at least the following aspects are contemplated. In an aspect, the DM-RS field for UL SPS activation/reconfiguration for Rel-10 and beyond UEs is not used for virtual CRC in a UL CC when CIF is enabled. For such an aspect, the 3-bit CIF may serve the purpose of increased virtual CRC length. In the case of asymmetric 1:many downlink to uplink configuration (which is not supported in Rel-10), a 3-bit CIF-like field may be introduced and may replace the DM-RS field for the purpose of increased virtual CRC length. By implementing the aforementioned aspects, the same virtual CRC capability as in Rel-8 is maintained, while the DM-RS field may be used for PHICH mapping for uplink SPS, similar to the dynamic scheduling case in LTE-A multicarrier operations. A further aspect may include only releasing DM-RS partially for the purpose of PHICH mapping (instead of the entire 3-bit, only 1 or 2 bits are used for PHICH mapping), e.g., the most significant bit of DM-RS is set to 0, while the remaining 2 bits are dynamically set. This results in a tradeoff between PHICH resource mapping flexibility and false alarm probability.

Figure 12:
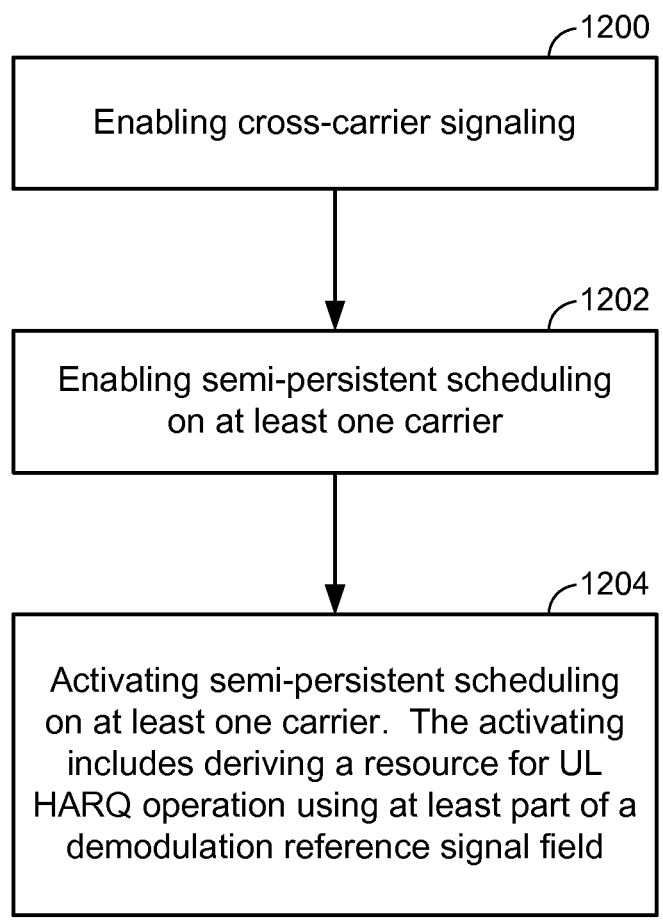
FIG. 12 is an illustration of resource mapping according to one aspect of the present disclosure.

Referring next to FIG. 12, an apparatus may execute a method for resource mapping for multicarrier operation. In block 1200 a UE may enable cross-carrier signaling. In block 1202 a UE may enable semi-persistent scheduling on at least one carrier. In block 1204 a UE may activate semi-persistent scheduling on the at least one carrier. The activating includes deriving a resource for uplink hybrid automatic repeat request (HARM) operation using at least part of a demodulation reference signal field.

In one configuration, a UE 120 is configured for wireless communication including means for enabling cross-carrier signaling, means for enabling semi-persistent scheduling on at least one carrier, and means for activating semi-persistent scheduling. In one aspect, the aforementioned means may be the memory 442, the controller/processor 440, and/or the scheduler 444. In another aspect, the aforementioned means may be a module or any apparatus configured to perform the functions recited by the aforementioned means.

In another configuration, a UE 120 is configured for wireless communication including means for indexing uplink resources starting with an uplink carrier paired with a corresponding downlink carrier and means for communicating on at least one of said uplink resources. In one aspect, the aforementioned means may be the memory 442, the controller/processor 440, the antenna 434, and/or the scheduler 444. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication executed by a user equipment configured for multicarrier operation, the method comprising:
    enabling cross-carrier signaling for a plurality of carriers, wherein enabling cross-carrier signaling comprises enabling an information field;
    enabling semi-persistent scheduling on at least one carrier from the plurality of carriers for which cross-carrier signaling has been enabled;
    using at least a part of the information field in place of at least a part of a demodulation reference signal field for a virtual cyclic redundancy check; and
    activating semi-persistent scheduling on the at least one carrier, the activating including deriving a resource for uplink hybrid automatic repeat request (HARQ) operation using at least the part of the demodulation reference signal field.

2. The method of claim 1 in which the resource comprises a physical HARQ indicator channel (PHICH) resource.

3. The method of claim 2 in which the resource reduces PHICH collision.

4. The method of claim 2 in which the PHICH resource is based on a starting physical resource block of uplink data transmission.

5. The method of claim 1 in which the at least one carrier comprises a primary carrier for the user equipment.

6. The method of claim 1 in which the user equipment is configured to have more than one semi-persistent scheduled carrier.

7. The method of claim 1 in which the information field is not enabled when cross-carrier signaling is not enabled.

8. An apparatus for wireless communication configured for multicarrier operation, the apparatus comprising:
    means for enabling cross-carrier signaling for a plurality of carriers, wherein the means for enabling cross-carrier signaling comprises means for enabling an information field;
    means for enabling semi-persistent scheduling on at least one carrier from the plurality of carriers for which the cross-carrier signaling has been enabled, wherein the means for enabling semi-persistent scheduling comprises means for using at least a part of the information field in place of at least part of a demodulation reference signal field for a virtual cyclic redundancy check; and
    means for activating semi-persistent scheduling on the at least one carrier, the means for activating including deriving a resource for uplink hybrid automatic repeat request (HARQ) operation using at the least part of the demodulation reference signal field.

9. The apparatus of claim 8 in which the resource comprises a physical HARQ indicator channel (PHICH) resource.

10. The apparatus of claim 9 in which the resource reduces PHICH collision.

11. The apparatus of claim 9 in which the PHICH resource is based on a starting physical resource block of uplink data transmission.

12. The apparatus of claim 8 in which the information field is not enabled when cross-carrier signaling is not enabled.

13. The apparatus of claim 8 in which the at least one carrier comprises a primary carrier for the user equipment.

14. The apparatus of claim 8 in which the user equipment is configured to have more than one semi-persistent scheduled carrier.

15. A computer program product configured for multicarrier operation for wireless communications in a wireless network, the computer program product comprising
    a non-transitory computer-readable medium having program code recorded thereon, the program code comprising:
        program code to enable cross-carrier signaling for a plurality of carriers, wherein the program code to enable cross-carrier signaling comprises program code to enable an information field;
        program code to enable semi-persistent scheduling on at least one carrier from the plurality of carriers for which the cross-carrier signaling has been enabled, wherein the program code to enable semi-persistent scheduling comprises program code for using at least a part of the information field in place of at least part of a demodulation reference signal field for a virtual cyclic redundancy check; and
        program code to activate semi-persistent scheduling on the at least one carrier, the program code to activate including program code to derive a resource for uplink hybrid automatic repeat request (HARQ) operation using at least the part of the demodulation reference signal field.

16. The computer program product of claim 15 in which the resource comprises a physical HARQ indicator channel (PHICH) resource.

17. The computer program product of claim 16 in which the resource reduces PHICH collision.

18. The computer program product of claim 16 in which the PHICH resource is based on a starting physical resource block of uplink data transmission.

19. The computer program product of claim 15 in which the information field is not enabled when cross-carrier signaling is not enabled.

20. The computer program product of claim 15 in which the at least one carrier comprises a primary carrier for the user equipment.

21. The computer program product of claim 15 in which the user equipment is configured to have more than one semi-persistent scheduled carrier.

22. An apparatus configured for multicarrier operation for wireless communication, comprising:
a memory; and
at least one processor coupled to the memory and configured:
to enable cross-carrier signaling for a plurality of carriers, wherein enabling cross-carrier signaling comprises enabling an information field;
to enable semi-persistent scheduling on at least one carrier from the plurality of carriers for which the cross-carrier signaling has been enabled;
to use at least a part of the information field in place of at least part of a demodulation reference signal field for a virtual cyclic redundancy check; and
to activate semi-persistent scheduling on the at least one carrier by deriving a resource for uplink hybrid automatic repeat request (HARQ) operation using at least the part of the demodulation reference signal field.

23. The apparatus of claim 22 in which the resource comprises a physical HARQ indicator channel (PHICH) resource.

24. The apparatus of claim 23 in which the resource reduces PHICH collision.

25. The apparatus of claim 23 in which the PHICH resource is based on a starting physical resource block of uplink data transmission.

26. The apparatus of claim 22 in which the at least one carrier comprises a primary carrier for the apparatus.

27. The apparatus of claim 22 in which the apparatus is configured to have more than one semi-persistent scheduled carrier.

28. The apparatus of claim 22 in which the information field is not enabled when cross-carrier signaling is not enabled.

* * * * *